United States Patent
Hamilton, II et al.

(10) Patent No.: US 8,386,565 B2
(45) Date of Patent: Feb. 26, 2013

(54) COMMUNICATION INTEGRATION BETWEEN USERS IN A VIRTUAL UNIVERSE

(75) Inventors: Rick A. Hamilton, II, Charlottesville, VA (US); Robert C. McGinley, Olympia, WA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 12/344,793

(22) Filed: Dec. 29, 2008

(65) Prior Publication Data

US 2010/0169184 A1    Jul. 1, 2010

(51) Int. Cl.
*G06F 15/16* (2006.01)
*G06F 3/048* (2006.01)

(52) U.S. Cl. .................................. 709/204; 715/757
(58) Field of Classification Search .......... 709/204–207, 709/217–219; 715/700, 738, 739, 751–759
See application file for complete search history.

(56) References Cited

U.S. PATENT DOCUMENTS

| | | | |
|---|---|---|---|
| 6,772,195 B1 * | 8/2004 | Hatlelid et al. ............... | 709/204 |
| 7,027,055 B2 | 4/2006 | Anderson et al. | |
| 7,250,944 B2 | 7/2007 | Anderson et al. | |
| 2002/0124236 A1 | 9/2002 | Ruths et al. | |
| 2004/0017403 A1 | 1/2004 | Andersson et al. | |
| 2004/0034795 A1 | 2/2004 | Anderson et al. | |
| 2007/0100739 A1 * | 5/2007 | Cui et al. ......................... | 705/37 |
| 2007/0179867 A1 * | 8/2007 | Glazer et al. ................... | 705/27 |
| 2007/0223675 A1 * | 9/2007 | Surin et al. ............... | 379/202.01 |
| 2007/0283417 A1 * | 12/2007 | Smolen et al. .................... | 726/2 |
| 2008/0004118 A1 * | 1/2008 | Van Luchene et al. ......... | 463/42 |
| 2008/0252637 A1 * | 10/2008 | Berndt et al. ................. | 345/419 |
| 2008/0262910 A1 * | 10/2008 | Altberg et al. ................... | 705/14 |
| 2008/0262911 A1 * | 10/2008 | Altberg et al. ................... | 705/14 |
| 2008/0263446 A1 * | 10/2008 | Altberg et al. ................. | 715/706 |
| 2008/0263458 A1 * | 10/2008 | Altberg et al. ................. | 715/757 |
| 2008/0263459 A1 * | 10/2008 | Altberg et al. ................. | 715/757 |
| 2008/0263460 A1 * | 10/2008 | Altberg et al. ................. | 715/757 |
| 2009/0144267 A1 * | 6/2009 | Cook et al. ......................... | 707/5 |
| 2009/0165140 A1 * | 6/2009 | Robinson et al. ............... | 726/26 |
| 2010/0030660 A1 * | 2/2010 | Edwards .......................... | 705/27 |

* cited by examiner

*Primary Examiner* — Patrice Winder
*Assistant Examiner* — Julian Chang
(74) *Attorney, Agent, or Firm* — William E. Schiesser; Ronald A. D'Alessandro; Keohane & D'Alessandro PLLC (57) ABSTRACT

An invention for communication integration between users of a virtual universe is provided. In one embodiment, there is a communication integration interface tool that provides communication integration between users within the virtual universe. In this embodiment, there is a response component for identifying an object of interest in the virtual universe, the object of interest comprising at least one of the following: a first user, or an asset associated with the first user that is within the virtual universe, and generating a response from the object of interest in the virtual universe. The communication integration interface tool further includes a communication link component for establishing a communication link between a second user and at least at least one of the following: the first user, a representative of the first user, or a third user in the virtual universe associated with the asset based on the generated response.

19 Claims, 6 Drawing Sheets

COMMUNICATION INTEGRATION BETWEEN USERS IN A VIRTUAL UNIVERSE

FIELD OF THE INVENTION

This invention relates generally to communications and more specifically to communication integration between users in a virtual universe.

BACKGROUND OF THE INVENTION

Virtual universes or virtual worlds are computer-based simulated environments intended for its users or residents to inhabit and interact via avatars, which are personas or representations of the users of the virtual universes and generally take the form of two-dimensional or three-dimensional human or fantastical representations of a person's self. These types of virtual universes are now most common in massively multiplayer online games such as Second Life, which is a trademark of Linden Research in the United States. Avatars in these types of virtual universes, which can number well over a million, have a wide range of business and social experiences.

Some virtual universes allow users to create their own assets using software to design 3D models and environment programming interfaces. Residents/users also buy and sell such assets. Many of these assets have value to other users of the environment, but are difficult for potential purchasers to locate. Additionally, the users who possess, develop, trade, and sell the asset lack knowledge of the available market, or ways to contact potential customers.

Therefore, what is needed in the art is a solution that overcomes the shortcomings and deficiencies of the prior art.

SUMMARY OF THE INVENTION

In one embodiment, there is a method for providing communication integration between users in a virtual universe. In this embodiment, the method comprises: identifying an object of interest in the virtual universe, the object of interest comprising at least one of the following: a first user, or an asset associated with the first user that is within the virtual universe; generating a response from the object of interest in the virtual universe; and establishing a communication link between a second user and at least one of the following: the first user, a representative of the first user, or a third user within the virtual universe based on the generated response.

In a second embodiment, there is a computer system for providing communication integration between users of a virtual universe. In this embodiment, the system comprises at least one processing unit and memory operably associated with the at least one processing unit. A communication integration interface tool is storable in memory and executable by the at least one processing unit. The communication integration interface tool comprises a response component configured to: identify an object of interest in the virtual universe, the object of interest comprising at least one of the following: a first user, or an asset associated with the first user that is within the virtual universe, and generate a response from the object of interest. A communication link component is configured to establish a communication link between a second user and at least one of the following: the first user, a representative of the first user, or a third user within the virtual universe based on the generated response.

In a third embodiment, there is a computer-readable medium storing computer instructions, which when executed, enables a computer system to provide communication integration between a virtual universe and a communication device external to the virtual universe. In this embodiment, the computer instructions comprise: identifying an object of interest in the virtual universe, the object of interest comprising at least one of the following: a first user, or an asset associated with the first user that is within the virtual universe; generating a response from the object of interest in the virtual universe; and establishing a communication link between a second user and at least one of the following: the first user, a representative of the first user, or a third user within the virtual universe based on the generated response.

In a fourth embodiment, there is a method for deploying a communication integration interface tool for use in a computer system that provides communication integration between users of a virtual universe. In this embodiment, a computer infrastructure is provided and is operable to: identify an object of interest in the virtual universe, the object of interest comprising at least one of the following: a first user, or an asset associated with the first user that is within the virtual universe; generate a response from the object of interest in the virtual universe; and establishing a communication link between a second user and at least one of the following: the first user, a representative of the first user, or a third user within the virtual universe based on the generated response.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to establishing communication links between users within a virtual universe, such that assets and users associated with the assets in the virtual universe can be discovered by other users. In these embodiments, a communication integration interface tool provides the capability to establish communication links between users in the virtual universe such that when a user is viewing an asset, the user can identify the owner of the asset (or their representative), as well as any other user that owns the asset. Additionally, the communication integration interface tool links asset owners (or their representatives) to their assets such that when a user is viewing an asset owner, the user can also view the asset owner's asset(s).

Benefits of using the communication integration interface tool include, but are not limited to: enhanced interactions between users within the virtual universe; enabling bidirectional linking of assets and asset owners; greater accessibility of residents to other residents of the virtual universe; and greater ability to maintain participation in on-demand enterprises within the virtual universe. Other benefits include a communication integration interface tool that allows users to establish a communication link to other users based on an asset that is of interest to both users.

Figure 1:
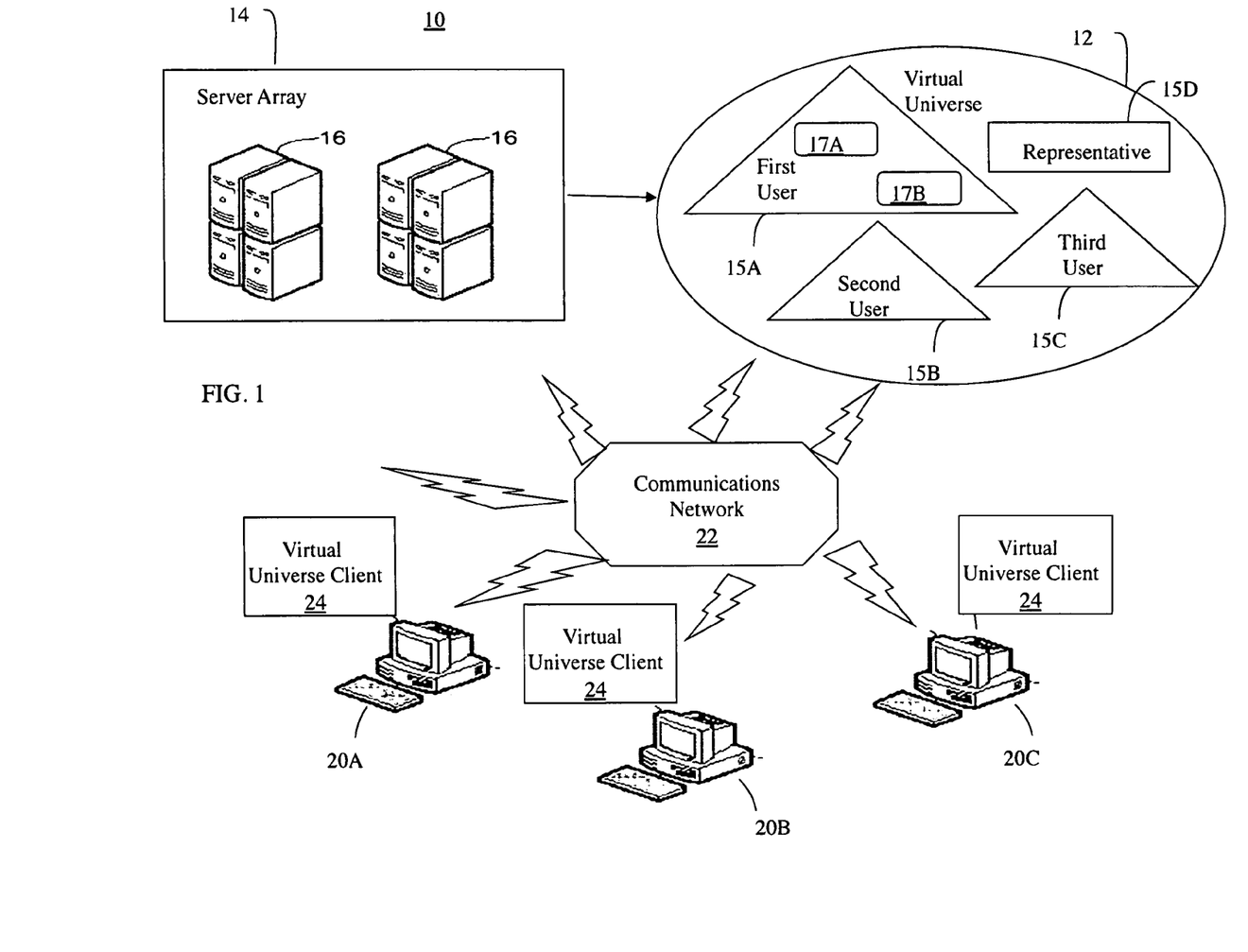
FIG. 1 shows a high-level schematic diagram showing a networking environment for providing a virtual universe according to one embodiment of this invention.

FIG. 1 shows a high-level schematic diagram including a networking environment 10 for providing a virtual universe 12 according to one embodiment of this invention in which a communication integration interface tool can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massively multiplayer online game, for example, can employ thousands of servers to manage all of the virtual real estate. The content of the virtual real estate that is managed by each of the servers 16 within the server array 14 shows up in the virtual universe 12 as a variety of different virtual regions.

Like the real-world, the virtual universe 12 comprises a living landscape having assets 17A, 17B (collectively referred to as assets 17), such as products, goods, buildings, stores, clubs, sporting arenas, parks, beaches, cities and towns all created by users 15A-15C (collectively referred to as users 15) of the universe 12 that are represented by avatars. These examples of users 15 and assets 17 are only illustrative of some things that may be found in a virtual region and are not limiting. It can be appreciated that an almost unlimited number of users 15 and assets 17 may be present in the virtual universe 12. However, for the sake of explanation, the virtual universe 12 will be described with respect to three users 15A-15C, as well as a representative 15D that represents one or more of the users 15, as will be described below. In one embodiment, user 15A represents a first user, user 15B represents a second user, and user 15C represents a third user within the virtual universe 12. It is also assumed that first user 15A is the owner of assets 17A and 17B, and the second user 15B is a user within the virtual universe 12 seeking to view the assets 17, view the first user 15A (or representative 15D), or to identify a third user 15C that may also own one of the assets 17 and/or similar assets. However, it can be appreciated that in another embodiment of the invention, the second user 15B may also own assets that are viewable to other users within the virtual universe.

The users 15 correspond to virtual universe clients 24A-24C and may be represented by avatars within the virtual universe 12. FIG. 1 also shows that clients operating computers 20A-20C (hereinafter referred generally as 20) interact with the virtual universe 12 through a communication network 22 via virtual universe clients 24A-24C (hereinafter referred generally as 24) that resides in the computers, respectively. In addition, FIG. 1 shows that clients 24 interact with the virtual universe 12 through the communication network 22 via a communication integration interface tool (not shown in this figure). Below are further details of the virtual universe 12, server array 14, and virtual universe client 24, including the use of the communication integration interface tool to facilitate communication between users 15 of the virtual universe 12.

Figure 2:
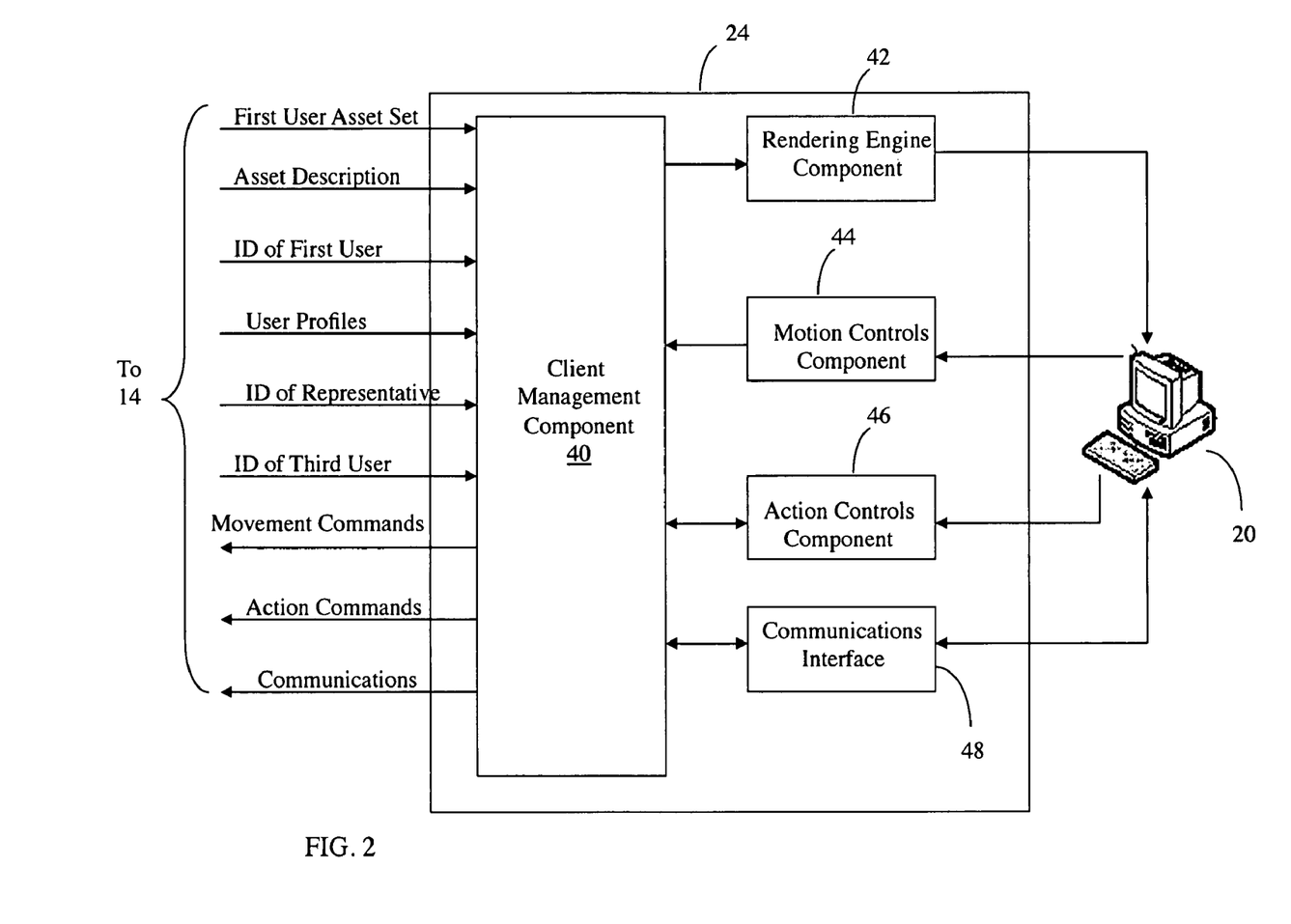
FIG. 2 shows a more detailed view of the virtual universe client shown in FIG. 1.

FIG. 2 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the virtual universe 12 that the avatar is presently located, as well as render a response from users 15 or assets 17 within the virtual universe 12. As used herein, rendering is the process of producing the pixels of an image from a higher-level description of its components. Additionally, rendering is the process of generating an image from a model, by means of computer programs. The model is a description of three-dimensional objects in a strictly defined language or data structure. Models contain, for example, geometry, viewpoint, texture, lighting, and shading information.

A motion controls component 44 enables the user to make movements through the virtual universe. In one embodiment, movements through the virtual universe can include, for example, gestures, postures, walking, running, driving, flying, etc. An action controls component 46 enables the user to perform actions in the virtual universe, such as buying items for his or her avatar or even for their real-life selves, building homes, planting gardens, etc. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

FIG. 2 shows the various types of information received by the client management component 40 from the virtual universe through the server array 14. In particular, the client management component 40 receives information about the users 15 and the assets 17 within the virtual universe 12. The client management component 40 may receive, for example, a textual description of the assets 17, an identity of the first user 15A, a profile of the first user 15A, an identity of the representative 15D of the first user 15A, an identity of the third user 15C in the virtual universe associated with the assets 17, and a set (i.e., one or more) of other assets associated with the first user 15A. In addition, the client management component 40 receives location information about the area that the user's avatar is near (e.g., what region or land the avatar is in), as well as scene information (e.g., what the avatar sees). The client management component 40 also receives proximity information, which contains information on what the user's avatar is near, and asset information, which is information that can be obtained by one's senses (e.g., touch, taste, smell, etc.,). The client management component 40 also receives information about possible actions for nearby assets (e.g., invoking, pushing, picking up, etc.).

FIG. 2 also shows the movement commands and action commands that are generated by the users 15 and sent to the server array 14 via the client management component 40, as well as the communications that can be sent to the users of other avatars within the virtual universe 12. The communications can include communications sent to the server array 14 from users operating real world communication devices (not shown).

Figure 3:
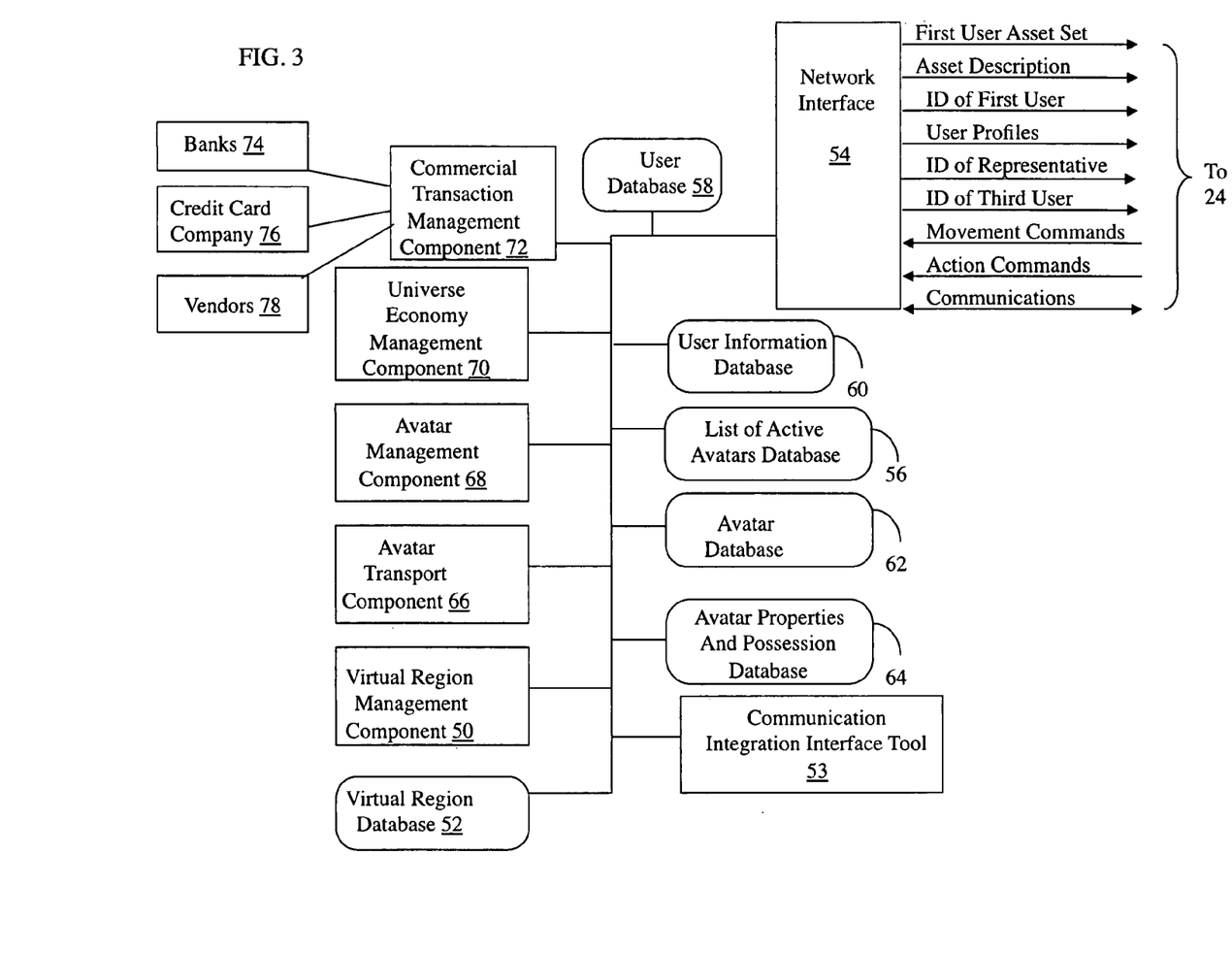
FIG. 3 shows a more detailed view of some of the functionalities provided by the server array shown in FIG. 1.

FIG. 3 shows a more detailed view of some of the functionalities provided by the server array 14 shown in FIG. 1. In particular, FIG. 3 shows a virtual universe management component 50 that manages virtual regions within the virtual universe 12. In particular, the virtual universe management component 50 manages what happens in a particular region such as the type of landscape in that region, the number of homes, commercial zones, boutiques, streets, parks, restaurants, etc. For example, the virtual universe management component 50 would allow the owner of a particular region or establishment within the region to specify requirements for entering or remaining within the region that could potentially affect certain avatar characteristics. In addition, the virtual universe management component 50 would allow the owner of a particular region or establishment to provide a textual description that describes the area in more detail so that the avatars can ascertain if there will be a potential effect on their use of specific inventory items within that region. Those skilled in the art will recognize that the virtual universe management component 50 can manage many other facets within the virtual universe 12.

A virtual universe database 52 stores information on all of the specifics in the virtual universe 12 that the virtual universe management component 50 is managing. In one embodiment, for very large virtual universes, one server 16 may be responsible for managing one particular virtual region within the universe. In other embodiments, it is possible that one server 16 may be responsible for handling one particular land within a virtual region.

A communication integration interface tool 53 provides communication integration between users 15 of the virtual universe 12. In particular, the communication integration interface tool 53 is configured to generate a response from users 15 and assets 17 within the virtual universe and establish a communication link between users 15 based on the generated response. Below is a more detailed discussion of the communication integration interface tool 53 and how it performs the above-mentioned functions.

FIG. 3 shows a network interface 54 that enables the server array 14 to interact with the virtual universe client 24 residing on computer 20. In particular, the network interface 54 communicates information through the virtual universe client 24 about the users 15 and assets 17 within the virtual universe 12, including a textual description of the assets 17, an identity of the first user 15A, a profile of the first user 15A, an identity of the representative 15D of the first user 15A, an identity of the third user 15C in the virtual universe associated with the assets 17, and a set of other assets associated with the first user 15A. The network interface 54 also communicates avatar information, location information, scene information, and proximity location information. The network interface 54 receives movement and action commands, as well as communications from the user via the universe client 24.

As shown in FIG. 3, there are several different databases for storing information. In particular, database 56 contains a list of all the avatars that are online in the virtual universe 12. Databases 58 and 60 contain information on the actual human clients of the virtual universe 12. In one embodiment, database 58 contains general information on the client such as names, addresses, interests, ages, etc., while database 60 contains more private information on the clients such as email addresses, or billing information (e.g., credit card information) for taking part in transactions.

Databases 62 and 64 contain information on the avatars of the users that reside (i.e., the residents) in the virtual universe 12. In one embodiment, database 62 contains information such as all of the avatars that a user may have, the profile of each avatar, or avatar characteristics (e.g., appearance, voice and movement features). Database 64 contains an inventory of assets that they own. These inventory assets may be bought, sold, traded, etc., during operation of the virtual universe. Assets in a typical inventory may include various products, clothing, virtual pets, vehicles, electronic media (e.g., music files), or other possessions/items. Those skilled in the art will recognize that this listing of inventory assets is illustrative of possible items and is not exhaustive. For example, other inventory assets may include graphics files, sound files, animations, electronic documents, video files, avatar accessories, avatar body parts, avatar tools or other objects, avatar gestures, automated avatars, calling cards, landmarks (such as bookmarked locations) or other geographical information, items in a lost and found folder, note cards, photos and photo albums, scripts (e.g. macros to perform actions), textures, deleted items, or any other type of asset.

Each inventory asset may represent a piece of executable code or other data, which may be rendered in some fashion to the user during a session in the virtual universe 12. A clothing asset, for example, may be rendered as clothing for the user's avatar, while a virtual dog, in another example, may be rendered as an automated avatar that follows the user's avatar within the virtual universe. In other embodiments, inventory assets may be represented as non-executable data that may be used by the virtual universe to render the inventory item for the user when needed. The contents of a user's inventory are typically displayed in a hierarchical manner similar to an operating system's display of folders, subfolders, and files within a files system.

Those skilled in the art will recognize that databases 58-64 may contain additional information if desired. Although the above information is shown in FIG. 3 as being stored in databases, those skilled in the art will recognize that other means of storing information can be utilized.

An avatar transport component 66 enables users 15 to transport through space from one point to another point, instantaneously. As a result, an avatar could, for example, travel from a business region to a shopping region to purchase business supplies.

An avatar management component 68 keeps track of what online avatars are doing while in the virtual universe. For example, the avatar management component 68 can track where the avatar is presently located in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have its own currency that users 15 pay for with real-life money. The users 15 can then take part in commercial transactions for their avatars through the universe economy management component 70. For example, an avatar might make a purchase for a service using the virtual universe currency. In some instances, the user may want to take part in a commercial transaction that benefits him or her and not their avatar. In this case, a commercial transaction management component 72 allows the user to participate in the transaction. For example, while walking around a commercial zone, a user may see an asset (e.g., a pair of shoes) that he or she would like for themselves and not their avatar. In order to fulfill this type of transaction and others similarly related, the commercial transaction management component 72 interacts with banks 74, credit card companies 76 and vendors 78.

Figure 4:
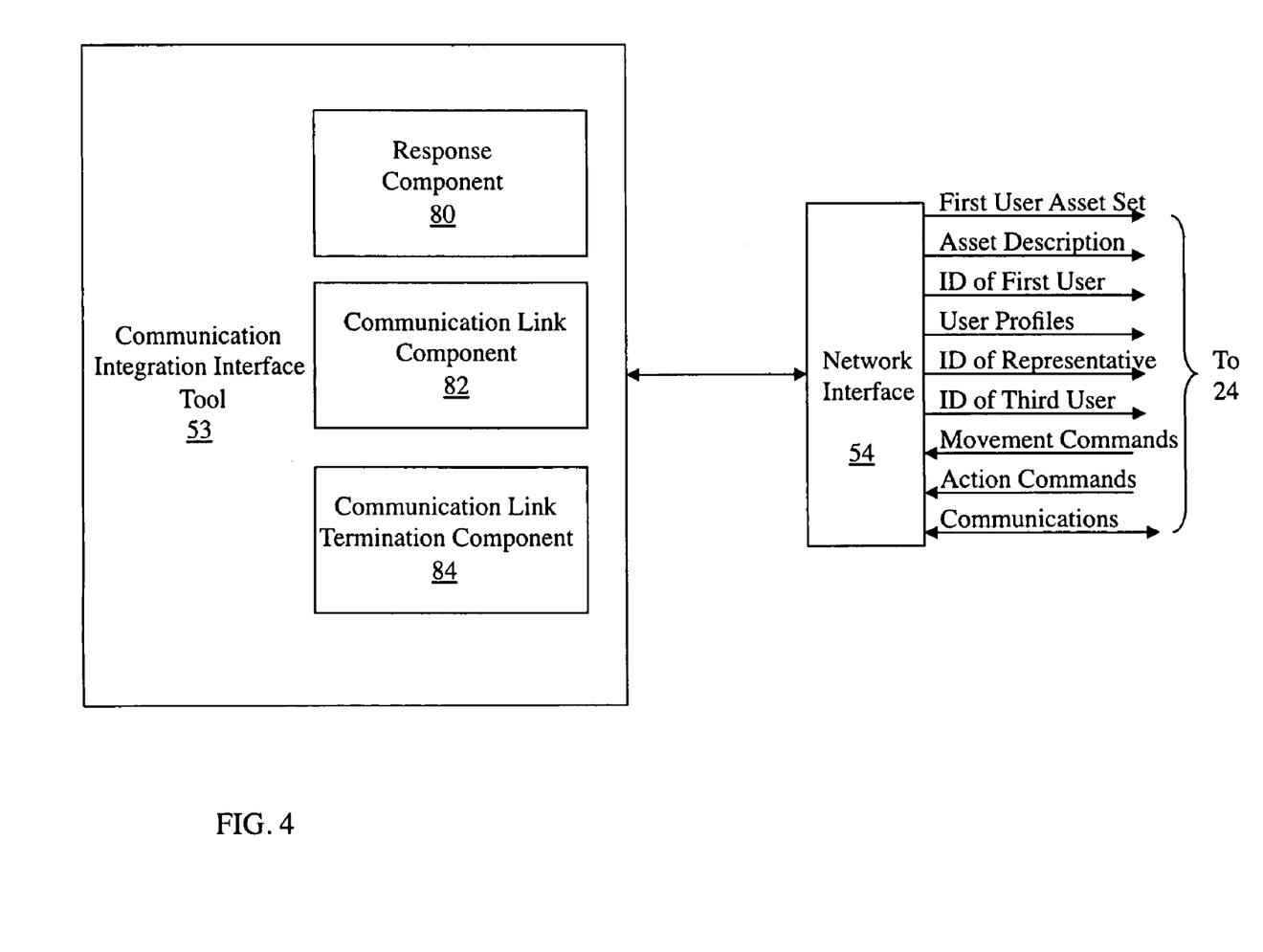
FIG. 4 shows a communication integration interface tool according to one embodiment of this invention that operates in the environment shown in FIG. 1.

FIG. 4 shows a more detailed view of the communication integration interface tool 53. As mentioned above, the communication integration interface tool 53 provides communication integration between users 15 of the virtual universe 12. In FIG. 4, the communication integration interface tool 53 resides on the same computer system as the server 14 and communicates directly to the virtual universe 12 and its users 15 via the virtual universe client 24. In other embodiments, the communication integration interface tool 53 might reside on the same computer as the virtual universe client 24, have components that reside on both the server 14 and virtual universe client 24, or reside on separate computers in direct communication with the virtual universe servers 16 and virtual universe clients 24.

FIG. 4 shows that the communication integration interface tool 53 comprises a response component 80 configured to identify an object of interest in virtual universe 12, wherein the object of interest comprises at least one of the following: the first user 15A or the assets 17A, 17B associated with the first user 15A that is within the virtual universe 12. Response component 80 is configured to generate a response from the object of interest in virtual universe 12. During operation, the second user 15B, through his/her avatar(s), navigates the virtual universe 12. If the second user 15B encounters one of the assets 17 within the virtual universe 12, a real-time response is generated from the encountered asset and rendered to the second user 15B. In one embodiment, the generated response may comprise a rendering of at least one of the following: a textual description of the asset 17, an identity of the first user 15A, a profile of the first user 15A associated with the asset 17, an identity of the representative 15D of the first user 15A, an identity of the third user 15C in the virtual universe 12 associated with the assets 17, or any other asset that may be associated with the first user 15A.

During operation, it is also likely that the second user 15B may encounter the first user 15A (through his/her avatar) while navigating the virtual universe 12. While some assets and asset information may be initially apparent upon meeting the first user 15A, a response can be generated from the first user 15A and rendered to the second user 15B to provide further information. In one embodiment, the response may comprise rendering at least at least one of the following: a set of all the assets associated with the first user 15A, a profile of the first user 15A, or an identity of the representative 15D of the first user 15A.

The response component 80 is configured to issue a request to the users 15 or assets 17 within the virtual universe 12. The request indicates that there is a desire to gain further information and initiate a communication link between users 15 of the virtual universe 12 based on this information. Those skilled in the art will recognize that the response component 80 can be used to request asset and/or user information from a user that is logged out of virtual universe 12 but may be logged into another virtual world environment or a social network environment.

Furthermore, the generated response can be controlled by the first user 15A. The first user 15A may control the assets 17 to be viewable to individuals, groups, the public, or be location specific. For example, the first user 15A may be participating in a team competition such as a scavenger hunt, and may want to allow teammates to view inventory assets related to the competition. The first user 15A may also apply the control to be limited to a virtual universe location such as an island, therefore enabling teammates (a group) to view inventory assets of the first user 15A only when on a specific island.

The first user 15A may control the visibility of the assets 17, either by time range, online status, or always. For example, the first user may set an asset to be viewable by others users only when the first user 15A is logged on, allowing the first user 15A to interact with interested parties.

The first user 15A may also provide descriptions about the assets 17. This may be information about the creation of the asset, a story about the asset, an owner history, a sales history, or any other information pertinent to the asset. Asset description information may also be persistent from owner to owner, so that a user can view the history of the asset. In one example, the first user 15A acquires a virtual universe replica of a Corvette automobile, and enables public viewing of the Corvette. The owner may also disclose within object metadata that the Corvette is viewable for an upcoming Corvette memorabilia event, where other similar assets may be available.

The first user 15A may also assign an asset owner profile to a viewable asset. The first user 15A may create different profiles for different types of assets. For example, various assets specializing in buildings, vehicles, and clothing may each have a different asset genre. The building profile may contain images of palaces and architecture, while the vehicle profile may contain roadway images from exotic virtual universe locations.

Furthermore, the first user 15A can create links to other assets and asset owners as communication links, sharing these links with other users as will be further described below.

As shown in FIG. 4, the communication integration interface tool 53 further comprises a communication link component 82 configured to establish a communication link between the second user 15B and at least one of the following: the first user 15A, the representative 15D of the first user 15A, and the third user 15C within the virtual universe 12 based on the response from the first user 15A and/or assets 17. In one embodiment, the communication link component 82 establishes the communication link between the second user 15B and another user of the virtual universe 12 by generating a communication interface and/or generating a teleport interface.

In one embodiment, the communication interface includes a virtual universe chat interface. Instant messaging software is one type of virtual universe chat interface that can be used by the communication integration interface tool 53 to integrate a communication link between users 15 of the virtual universe 12. For example, the second user 15B can send an instant message to the first user 15A when the second user 15B encounters one of the assets 17 owned by the first user 15A. In this embodiment, the communication integration interface tool 53 provides the necessary protocols for instant messaging between the users 15 within the virtual universe 12. The virtual universe 12 can be configured to interface with an instant messaging provider to transmit and receive messages.

The communication link component 82 may also establish the communication link by generating a teleport interface. Viewable assets may be configured to allow users to teleport to the asset owner's location. In one example, the second user 15B locates a clothing asset owned by the first user 15A that the second user 15B would like to purchase. The second user 15B may select the clothing asset, and choose to teleport directly to the location of the first user 15A, a location of the representative 15D of the first user 15A, or a location designated by the first user 15A in the event the first user 15A is not online.

In another embodiment, the communication link component 82 is also configured to verify the identity of the users 15 prior to establishing the communication link. Well-known verification methods that include but are not limited to use of a password, voice recognition, etc., can be used to verify the identities of users prior to establishing the communication between parties.

Referring again to FIG. 4, the communication integration interface tool 53 further comprises a communication link termination component 84 configured to terminate the communication link between the users 15 of the virtual universe 12. In one embodiment, the communication link termination component 84 will remove the rendering of the avatar of one or both of the users 15 from the virtual universe 12 upon completion of the communication. Those skilled in the art will recognize that there are a variety of ways to terminate the communication.

Below are examples of how the communication integration interface tool 53 can be used to establish a communication link between users 15 within the virtual universe 12.

In one example, the first user 15A (asset owner) acquires a unique furniture asset, e.g., a couch, and sets the couch to 'viewable,' making the couch viewable to other users within the virtual universe 12. The first user 15A may set the permission for the couch to 'All Users', allowing all users in the virtual universe 12 to see the first user's properties, as well as other assets of the first user 15A. The first user 15A may set the visibility of the couch to 'Permanent', making the information visible even when the first user 15A is not online, and enters information about why the couch is viewable. For example, the first user 15A enters 'Pete's Unique Furniture, Leisure Island', as information about where the couch was purchased.

The first user 15A assigns an asset owner profile to the couch so that users may find out more information about the first user 15A. For example, the first user 15A assigns a furniture profile designation to the couch asset. When clicked on, the asset owner profile shows a picture of the other furniture owned by the first user 15A.

The first user 15A may also enter a description of the couch, if it has not been entered by a previous owner, and enables the couch to allow direct teleports from other users to the location of the first user 15A and/or the couch. For example, a user can select the couch and transport directly to the first user's current location within the virtual universe 12.

The first user 15A can also add links to the asset. For example, the first user 15A adds a link to the asset creator's shop 'Pete's Unique Furniture Shop'. When the second user 15B chooses this link, the second user 15B may be teleported to Pete's shop location. The first user 15A may add another link that directs users to an external website for 'Reinhard Antique Furniture Outlet.' A user that chooses this link inside the virtual universe 12 is taken to the website, typically via an Internet browser.

In another example, the first user 15A places the couch in a virtual furniture store where the couch is typically found. The couch is now usable and selectable by virtual users 15 in the public space. For example, the second user 15B may now select the couch and choose to view the information about the first user 15A. The second user 15B may also select the couch and view a description written about the couch. The second user 15B may select the couch and choose to send the first user 15A a chat message. Furthermore, the second user 15B may select the couch and chose to view a set of other assets associated with the first user 15A. Or, the second user 15B may select the couch and choose to view a third user 15C within the virtual universe 12 with similar assets.

In another embodiment of the invention, each asset in the virtual universe 12 may have an associated standardized code or tag. For example, such a tag may be: object category, object type, object model, object creator, object price, object description. Consider the following fractal artwork tag:

Art, fractal, Julia-set-1083, John Doe, $1.00, "predominantly red design with brown frame made according to Pickover's book A Passion for Mathematic, page 32."

The first user 15A may be interested in fractal art and want to form a club or relationship with other users having the same or similar assets. The first user 15A queries the communication integration interface tool 53 by typing key words into a keyword search interface. The communication integration interface tool 53 identifies several owners of fractal artwork, by searching through asset tags, and (optionally) teleports the first user 15A to these other users or to an area proximate to the asset location. Thus, the communication integration interface tool 53 has access to both the asset tags and their current locations in the virtual universe 12. If multiple universes make use of the standard tag and interface, it may be possible to use this method between such universes.

In another embodiment of this invention, the communication integration interface tool 53 is used as a service to charge fees by the representative 15D of the first user 15A to at least at least one of the following: a provider of the virtual universe, the first user 15A, or the second user 15B. In this embodiment, the first user 15A designates the representative 15D to serve as a liaison for other users seeking information about the first user's assets. Once the representative 15D is assigned to an asset, the first user 15A cannot be viewed through the asset or the avatar of the first user 15A. The first user 15A is essentially anonymous. The representative 15D may charge a fee to provide representation services, thus creating a new business model within the virtual universe 12. The representative 15D may represent an unlimited number of users 15. Furthermore, users 15 may assign multiple assets to the representative 15D, or may use multiple representatives for multiple assets. The representative 15D can receive payment from the virtual universe users via the universe economy management component 70 and the commercial transaction management component 72.

In still another embodiment, the methodologies disclosed herein can be used within a computer system to establish communication links between users 15 in the virtual universe 12. In this case, the communication integration interface tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
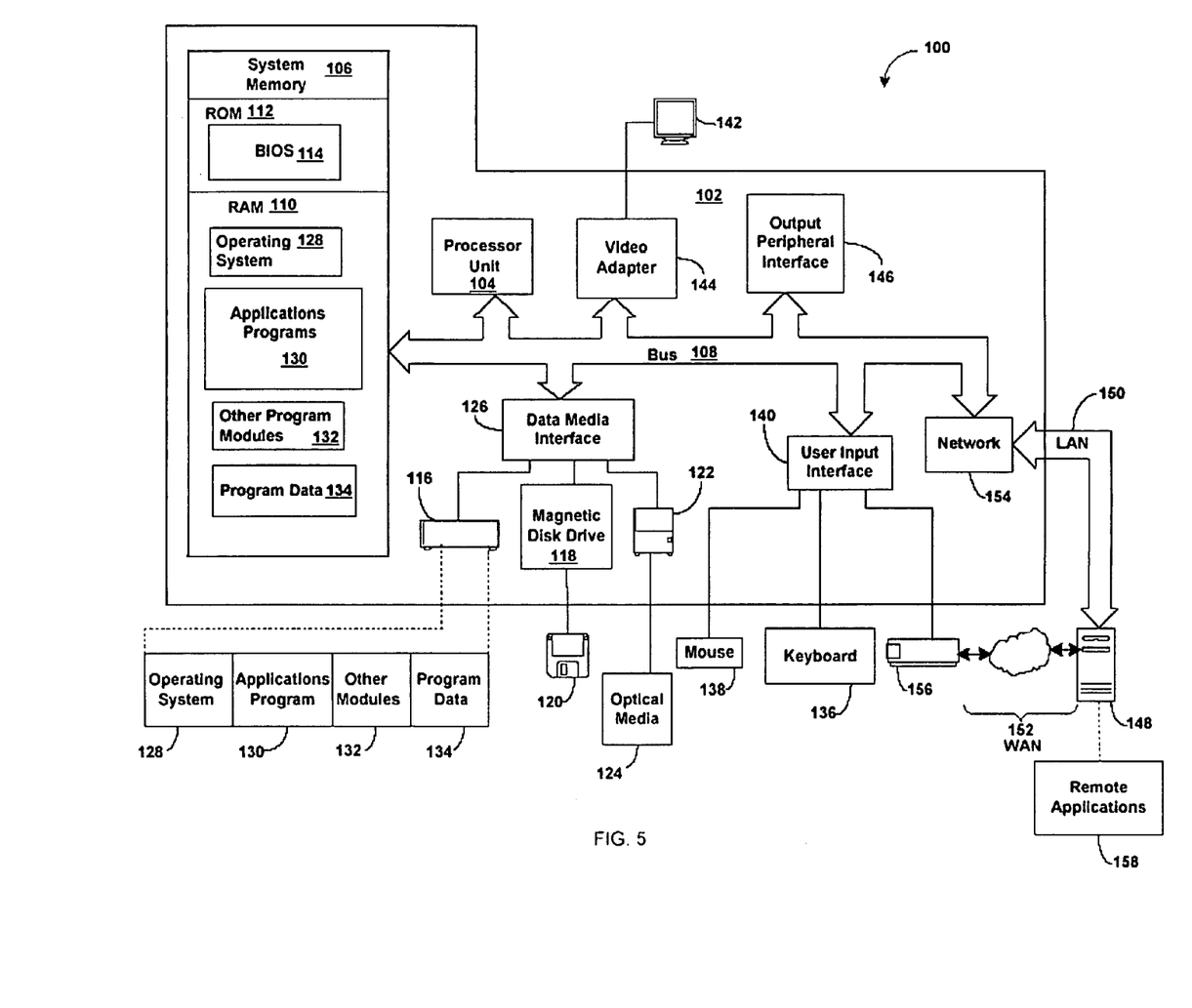
FIG. 5 shows a schematic of an exemplary computing environment in which elements of the networking environment shown in FIG. 1 may operate.

FIG. 5 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the invention described herein. Neither should the computing environment 100 be interpreted as having any dependency or requirement relating to any one or combination of components illustrated in FIG. 5.

In the computing environment 100 there is a computer 102, which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, which perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including the server array 14, the virtual universe client 24 and the communication integration interface tool 53. In one embodiment, the one or more application programs 130 include components of the communication integration interface tool 53 such as the response component 80, communication link component 82, and the communication link termination component 84.

Figure 6:
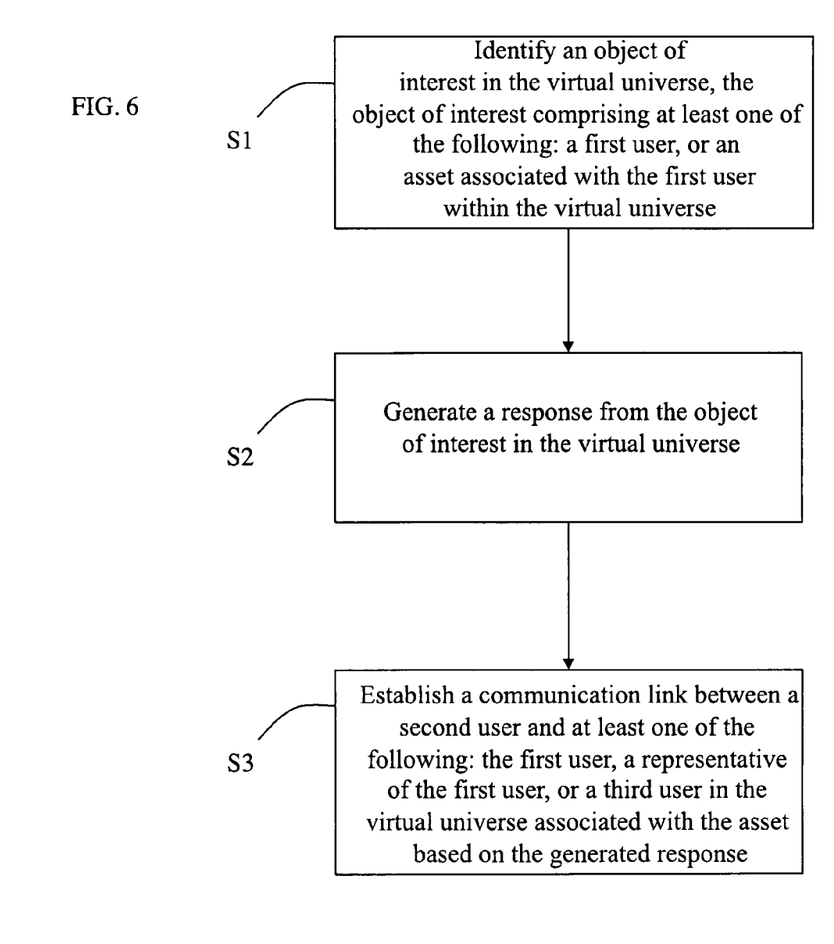
FIG. 6 shows a flow diagram of a method of communication integration between users of a virtual universe according to one embodiment of the invention.

The one or more program modules 130 carry out the methodologies disclosed herein, as shown in FIG. 6. According to one method, in step S1, an object of interest is identified in the virtual universe, wherein the object of interest comprises at least one of the following: a first user, or an asset associated with the first user that is within the virtual universe. In S2, a response is generated from the object of interest. In S3, a communication link is established between a second user and at least at least one of the following: the first user, a representative of the first user, or a third user in the virtual universe associated with the asset based on the generated response.

The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring again to FIG. 5, a user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN)

152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for communication integration between a virtual universe and an external device. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for providing communication integration between users of a virtual universe, comprising:
    identifying an object of interest in the virtual universe, the object of interest comprising at least one of the following: a first user, or an asset associated with the first user that is within the virtual universe;
    generating a response from the object of interest in the virtual universe, the response comprising all of the following:
        displaying the asset associated with the first user as well as a set of other assets owned by the first user in the case that the object of interest is the first user, wherein permission to display the other assets owned by the first user and access to the set of other assets owned by the first user is controlled by the first user;
        identifying an avatar operated by another user within the virtual universe also owning the asset associated with the first user; and
        displaying, to a second user of the virtual universe upon encountering the asset associated with the first user, a profile of the first user containing the set of other assets owned by the first user, the profile of the first user assigned to the asset by the first user, wherein the asset owner profile assigns an asset type to the asset associated with the first user and each of the set of other assets owned by the first user; and
    establishing a communication link between the second user and at least one of the following: the first user, a representative of the first user, and the avatar operated by the another user within the virtual universe also owning the asset associated with the first user.

2. The method according to claim 1, wherein establishing the communication link comprises at least one of the following: generating a communication interface, or generating a teleport interface.

3. The method according to claim 2, wherein generating the communication interface comprises generating a virtual universe chat interface.

4. The method according to claim 1, wherein generating the response from the asset further comprises rendering at least one of the following: an identity of the first user, an identity of the representative of the first user, and an identity of the another user.

5. The method according to claim 1, wherein generating the response from the first user comprises rendering at least one of the following: a profile of the first user, or an identity of the representative of the first user.

6. The method according to claim 1, further comprising charging a communication fee by the representative of the first user to at least one of the following: a provider of the virtual universe, the first user, or the second user.

7. A computer system for providing communication integration between users of a virtual universe, comprising:
    at least one processing unit;
    memory operably associated with the at least one processing unit; and
    a communication integration interface tool storable in memory and executable by the at least one processing unit, the tool comprising:
        a response component configured to:
            identify an object of interest in the virtual universe, the object of interest comprising at least one of the following: a first user, or an asset associated with the first user that is within the virtual universe; and
            generate a response from the object of interest in the virtual universe, the response comprising all of the following:
                displaying the asset associated with the first user as well as a set of other assets owned by the first user in the case that the object of interest is the first user, wherein permission to display the other assets owned by the first user and access to the set of other assets owned by the first user is controlled by the first user;

identifying an avatar operated by another user within the virtual universe also owning the asset associated with the first user; and displaying, to a second user of the virtual universe upon encountering the asset associated with the first user, a profile of the first user containing the set of other assets owned by the first user, the profile of the first user assigned to the asset by the first user, wherein the asset owner profile assigns an asset type to the asset associated with the first user and each of the set of other assets owned by the first user; and a communication link component configured to establish a communication link between the second user and at least one of the following: the first user, a representative of the first user, and the avatar operated by the another user within the virtual universe also owning the asset associated with the first user.

8. The system according to claim 7, wherein the communication link component is configured to perform at least one of the following: generate a communication interface, or generate a teleport interface.

9. The system according to claim 8, wherein the communication interface is configured to generate a virtual universe chat interface.

10. The system according to claim 7, wherein the response component is further configured to generate a response by rendering information about the asset, including at least one of the following: an identity of the asset owner, a profile of the asset owner, an identity of a representative of the asset owner, or an identity of the another user.

11. The system according to claim 7, wherein the response component is configured to render information about the first user, including an identity of the representative of the first user.

12. The system according to claim 7, wherein the communication integration interface tool further comprises a subscription component configured to charge a communication fee by the representative of the asset owner to at least one of the following: a provider of the virtual universe, the first user, or the second user.

13. A non-transitory computer-readable medium storing computer instructions, which when executed, enables a computer system to provide communication integration between users of a virtual universe, the computer instructions comprising:

identifying an object of interest in the virtual universe, the object of interest comprising at least one of the following: a first user, or an asset associated with the first user that is within the virtual universe;

generating a response from the object of interest in the virtual universe, the response comprising all of the following:

displaying the asset associated with the first user as well as a set of other assets owned by the first user in the case that the object of interest is the first user, wherein permission to display the other assets owned by the first user and access to the set of other assets owned by the first user is controlled by the first user;

identifying an avatar operated by another user within the virtual universe also owning the asset associated with the first user; and displaying, to a second user of the virtual universe upon encountering the asset associated with the first user, a profile of the first user containing the set of other assets owned by the first user, the profile of the first user assigned to the asset by the first user, wherein the asset owner profile assigns an asset type to the asset associated with the first user and each of the set of other assets owned by the first user; and establishing a communication link between the second user and at least one of the following: the first user, a representative of the first user, and the avatar operated by the another user within the virtual universe also owning the asset associated with the first user.

14. The non-transitory computer-readable medium according to claim 13, wherein generating the response from the asset comprises instructions for rendering at least one of the following: a textual description of the asset, an identity of the first user, a profile of the first user, an identity of the representative of the first user, or an identity of the another user.

15. The non-transitory computer-readable medium according to claim 13, wherein generating the response from the first user comprises instructions for rendering an identity of the representative of the first user.

16. The non-transitory computer-readable medium according to claim 13, wherein establishing the communication link comprises instructions for rendering at least one of the following: a communication interface, or a teleport interface.

17. The non-transitory computer-readable medium according to claim 16, wherein rendering the communication interface comprises instructions for generating a virtual universe chat interface.

18. The non-transitory computer-readable medium according to claim 13, further comprising instructions for charging a communication fee to at least one of the following: the provider of the virtual universe, the first user, or the second user.

19. A method for deploying a communication integration interface tool for use in a computer system that provides communication integration between users of a virtual universe, comprising:

providing a computer infrastructure operable to:

identify an object of interest in the virtual universe, the object of interest comprising at least one of the following: a first user, or an asset associated with the first user that is within the virtual universe generate a response from the object of interest in the virtual universe, the response comprising all of the following:

displaying the asset associated with the first user as well as a set of other assets owned by the first user in the case that the object of interest is the first user, wherein permission to display the other assets owned by the first user and access to the set of other assets owned by the first user is controlled by the first user;

identifying an avatar operated by another user within the virtual universe also owning the asset associated with the first user; and displaying, to a second user of the virtual universe upon encountering the asset associated with the first user, a profile of the first user containing the set of other assets owned by the first user, the profile of the first user assigned to the asset by the first user, wherein the asset owner profile assigns an asset type to the asset associated with the first user and each of the set of other assets owned by the first user; and establish a communication link between the second user and at least one of the following: the first user, a representative of the first user, and the avatar operated by the another user within the virtual universe also owning the asset associated with the first user.

* * * * *